(12) United States Patent
Bao et al.

(10) Patent No.: US 9,295,002 B2
(45) Date of Patent: Mar. 22, 2016

(54) METHOD AND DEVICE FOR OPEN LOOP UPLINK ACCESS POWER CONTROL

(75) Inventors: Dongshan Bao, Beijing (CN); Lijun Pan, Beijing (CN); Huijuan Yao, Beijing (CN); Yubao Zhou, Beijing (CN); Xiaoyan Yu, Beijing (CN); Jun Lei, Beijing (CN); Jing Wang, Beijing (CN); Shenfa Liu, Beijing (CN); Zhigang Yan, Beijing (CN)

(73) Assignee: Nufront Mobile Communications Technology Co., Ltd., Beijing (CN)

( * ) Notice: Subject to any disclaimer, the term of this patent is extended or adjusted under 35 U.S.C. 154(b) by 353 days.

(21) Appl. No.: 14/008,616

(22) PCT Filed: Mar. 5, 2012

(86) PCT No.: PCT/CN2012/071929
§ 371 (c)(1),
(2), (4) Date: Dec. 3, 2013

(87) PCT Pub. No.: WO2012/130017
PCT Pub. Date: Oct. 4, 2012

(65) Prior Publication Data
US 2015/0085732 A1    Mar. 26, 2015

(30) Foreign Application Priority Data

| Mar. 31, 2011 | (CN) | 2011 1 0081193 |
| Mar. 31, 2011 | (CN) | 2011 1 0081288 |
| May 19, 2011 | (CN) | 2011 1 0130194 |
| Feb. 7, 2012 | (CN) | 2012 1 0026860 |
| Feb. 17, 2012 | (CN) | 2012 1 0038612 |

(51) Int. Cl.
*H04W 4/00* (2009.01)
*H04W 52/10* (2009.01)
(Continued)

(52) U.S. Cl.
CPC ............ *H04W 52/10* (2013.01); *H04W 4/06* (2013.01); *H04W 52/12* (2013.01); *H04W 52/241* (2013.01); *H04W 52/262* (2013.01); *H04W 72/042* (2013.01); *H04W 72/0473* (2013.01); *H04W 52/146* (2013.01); *H04W 52/226* (2013.01); *H04W 52/242* (2013.01)

(58) Field of Classification Search
CPC . H04W 52/10; H04W 52/146; H04W 52/262; H04W 52/241; H04W 52/242; H04W 52/243
USPC .......... 370/329–330, 335, 342; 455/63.1, 570
See application file for complete search history.

(56) References Cited

U.S. PATENT DOCUMENTS

| 8,260,207 B2 * | 9/2012 | Srinivasan | H04W 16/08 370/330 |
| 8,391,796 B2 * | 3/2013 | Srinivasan | H04W 16/08 370/329 |
| 8,412,103 B2 * | 4/2013 | Srinivasan | H04W 16/08 370/330 |

*Primary Examiner* — Thai Hoang
(74) *Attorney, Agent, or Firm* — Morgan, Lewis & Bockius LLP

(57) ABSTRACT

A method for open loop uplink access power control comprises: estimating the uplink transmission path loss according to received signal power of a station (STA) and the transmit power of a central access point (CAP); determining the transmission bandwidth allocated by the CAP for uplink transmission and deviation adjustment of the CAP; determining a modulation-coding mode and determining requirements of the carrier-to-noise ratio corresponding to the modulation-coding mode; and calculating a target value for adjusting the transmit power of the STA. Also disclosed is a device for open loop uplink access power control.

9 Claims, 3 Drawing Sheets

(51) Int. Cl.
*H04W 52/26* (2009.01)
*H04W 52/12* (2009.01)
*H04W 4/06* (2009.01)
*H04W 72/04* (2009.01)
*H04W 52/14* (2009.01)
*H04W 52/22* (2009.01)
*H04W 52/24* (2009.01)

METHOD AND DEVICE FOR OPEN LOOP UPLINK ACCESS POWER CONTROL

CROSS-REFERENCE TO RELATED APPLICATION

This application claims the benefit of a Chinese patent application No. 201110081193.4 filed on Mar. 31, 2011 and titled "A WIRELESS COMMUNICATION METHOD, SYSTEM AND DEVICE", which is incorporated herein by reference in its entirety.

This application claims the benefit of a Chinese patent application No. 201110130194.3 filed on May 19, 2011 and titled "A COMMUNICATION SYSTEM", which is incorporated herein by reference in its entirety.

This application claims the benefit of a Chinese patent application No. 201210026860.3 filed on Feb. 7, 2012 and titled "METHOD AND DEVICE FOR OPEN LOOP UPLINK ACCESS POWER CONTROL", which is incorporated herein by reference in its entirety.

This application claims the benefit of a Chinese patent application No. 201210038612.0 filed on Feb. 17, 2012 and titled "METHOD AND DEVICE FOR OPEN LOOP UPLINK ACCESS POWER CONTROL", which is incorporated herein by reference in its entirety.

FIELD OF THE INVENTION

This invention belongs to the field of wireless communication, especially related to method and device for open loop uplink access power control.

BACKGROUND OF THE INVENTION

In recent years, wireless communication systems have been developed rapidly. For example, wireless Local Area Network (WLAN) technologies based on IEEE 802.11 (i.e. WiFi), a Bluetooth system based on IEEE 802.15, and Femto technologies oriented to indoor applications that are derived from a mobile communication system have been widely used.

The WiFi technology based on IEEE 802.11 is the most extensively used wireless network transmission technology at present. A WiFi system is defective for its relatively low system efficiency and significant waste of wireless resources due to the employment of a Carrier Sense Multiple Access with Collision Avoidance (CSMA/CA) mechanism. An essential reason for such a defect lies in that the CSMA/CA mechanism is a random multi-access mechanism based on competition, and there exist competitions for the access right to wireless resources between a Central Access Point (CAP) and a Station (STA) or between different STAs due to the CSMA/CA mechanism. Simultaneous competitions for a wireless channel will result in a collision, thus leading to the wireless resource waste. To avoid such collision, the CSMA/CA mechanism requires the CAPs or STAs to retreat randomly from the competition for the wireless channel. If all of the CAPs and STAs retreat, the wireless channel is not utilized even it is idle, causing significant waste of the wireless channel. Therefore, the system efficiency of IEEE 802.11 is relatively low. For example, although the peak rate at the physical layer in an IEEE 802.11g system may reach 54 Mbps, the reachable peak rate of a large-packet download service at the Transmission Control Protocol (TCP) layer is no more than 30 Mbps. Despite of the above defects, the IEEE 802.11 system is flexible and does not rely on a centralized control mechanism, so that the device costs are relatively low.

A Femto technology based on 3GPP standards, which is derived from a mobile communication system, is a new technology intended for indoor coverage. Since about 70% of data services is conducted in doors according to data statistics of the 3G system, an indoor high-speed data access solution is especially important. A Femto base station, which is named as a Pico Base Transceiver Station, is small in volume (like in WiFi technologies) and flexible in deployment. The Femto base station inherits almost all features of a mobile communication system due to its derivation from the mobile communication system. Considering its limited coverage range and a relatively small number of access users, the Femto device is designed with a decreased processing capability, to reduce the device costs. In terms of a duplexing manner, Femto base stations may operate in two duplexing mechanisms, i.e. a Frequency Division Duplexing (FDD) and a Time Division Duplexing (TDD), just like the mobile communication system. Because FDD uplink and downlink carrier resources are symmetric, certain resource waste is caused for a data service in a FDD system due to a service feature that uplink and downlink data flow of the data service are asymmetric. In a TDD system, however, both uplink and downlink operate at the same carrier, and different wireless resources are allocated for the uplink and downlink through the division of time resources, thus the TDD system can be more suitable for a data service characterized by asymmetric uplink and downlink service demands, in comparison with an FDD system. In the mobile communication system (including a Femto system), however, due to the static allocation of uplink and downlink resources in the TDD duplexing manner, it is difficult to implement dynamic matching between service demands and resource division in the case of various data services with different demands, such as web surfing, mobile videos and mobile games. Due to the employment of a centralized control mechanism based on scheduling, and hence there is no wireless resource waste that is caused by competition collision between the Base Station or CAP and a User Equipment or between User Equipments and random retreat, the Femto technology is advantageous for a higher link efficiency in comparison with the WiFi technology.

For overcoming the consideration of factors such as path loss, demand for uplink transmission open-loop power control exists for wireless communication systems.

SUMMARY OF THE INVENTION

In view of this, one purpose of this invention is to provide two kinds of method of uplink transmission open loop power control.

Another purpose of this Invention is to provide two types of device of uplink transmission open loop power control.

A brief summarization is given below to provide a basic understanding of some aspects of the embodiments disclosed. This summarization part is not a general commentary, or to determine the key/important component elements or to describe the protection scope of these embodiments. The only object thereof is to present some concepts in a simple form, which act as a preamble of the subsequent detailed illustration.

The technical solution of the invention is realized as follows:

A method for open loop uplink access power control, this method comprises:

Estimating the uplink transmission path loss according to received signal power of a station (STA) and the transmit power of a central access point (CAP);

Determining the transmission bandwidth allocated by CAP for uplink transmission and deviation adjustment of CAP;

Determining a modulation-coding mode and determining requirements of the carrier-to-noise ratio corresponding to modulation-coding mode; and Calculating a target value for adjusting transmit power of the STA by following formula:

$$P_{STA}=\min\{P_{STA\_MAX}, PL_{OL}+C/N+10\log_{10}(BW)+\text{offset}_{CAP}+\text{offset}_{STA}\}$$

in which, $P_{STA\_MAX}$ is the maximum transmission power of said STA, $PL_{OL}$ is loss of uplink transmission path, C/N is the carrier-to-noise ratio corresponding to modulation and coding scheme, with respect to noise and interference on the receiving terminal, BW is the bandwidth distributed by access point CAP for the uplink transmission. $\text{offset}_{CAP}$ is deviation adjustment of said CAP, and $\text{offset}_{STA}$ is deviation adjustment of said STA.

Optionally, obtaining deviation adjustment of CAP by parsing the CAP broadcast message.

A method for open loop uplink access power control, this method comprises:

Estimating the uplink transmission path loss according to received signal power of a station (STA) and the transmit power of a central access point (CAP);

Determining the transmission bandwidth allocated by the CAP for uplink transmission;

Determining a modulation-coding mode and determining requirements of the carrier-to-noise ratio corresponding to modulation-coding mode; and Calculating a target value for adjusting transmit power of the STA by following formula:

$$P_{STA}=\min\{P_{STA\_MAX}, PL_{OL}+C/N+10\log_{10}(BW)\}$$

in which, $P_{STA\_MAX}$ is the maximum transmission power of the indicated STA, $PL_{OL}$ is the loss of uplink transmission path, C/N is the carrier-to-noise ratio corresponding to modulation and coding scheme, BW is bandwidth distributed by access point CAP for the uplink transmission.

Optionally, obtaining deviation adjustment of CAP by parsing the CAP broadcast message.

Optionally, STA obtain the resource indication by analyzing the control channel (CCH) of currently received physical frame, to determine transmission bandwidth distributed by CAP for the uplink transmission.

Optionally, STA acquire modulation encoding scheme indication by parsing the CCH of currently received physical frame, determining modulation and coding scheme, by lookup correspondence table between preset modulation encoding and carrier-to-noise ratio, determining a current modulation and coding scheme corresponding to carrier-to-noise ratio.

A device of uplink transmission open loop power control, characterized in, this device comprises:

First calculating unit, used for calculating the target value of STA transmission power.

First determining unit, used for determining CAP for uplink transmission allocation of transmission bandwidth.

Second determining unit, used for determining modulation and coding mode, and carrier-to-noise ratio corresponding to modulation and coding mode.

Third determining unit, used for determining deviation adjustment of the CAP;

Second calculating unit, used for calculating a target value for adjusting transmit power of the STA by following formula:

$$P_{STA}=\min\{P_{STA\_MAX}, PL_{OL}+C/N+10\log_{10}(BW)+\text{offset}_{CAP}+\text{offset}_{STA}\}$$

in which, $P_{STA\_MAX}$ is the maximum transmission power of the indicated STA, $PL_{OL}$ is the loss of uplink transmission path, C/N is the carrier-to-noise ratio corresponding to modulation and coding scheme, BW is bandwidth distributed by access point CAP for the uplink transmission.

Optionally, third determining unit obtaining deviation adjustment of CAP by parsing the CAP broadcast message.

A device of uplink transmission open loop power control, this device comprises:

First calculating unit, used for calculating the target value of STA transmission power.

First determining unit, used for determining CAP for uplink transmission allocation of transmission bandwidth.

Second determining unit, used for determining modulation and coding mode, and carrier-to-noise ratio corresponding to modulation and coding mode.

Second calculating unit, used for calculating a target value for adjusting transmit power of the STA by following formula:

$$P_{STA}=\min\{P_{STA\_MAX}, PL_{OL}+C/N+10\log_{10}(BW)\}$$

in which, $P_{STA\_MAX}$ is the maximum transmission power of the indicated STA, $PL_{OL}$ is the loss of uplink transmission path, C/N is the carrier-to-noise ratio corresponding to modulation and coding scheme, BW is bandwidth distributed by access point CAP for the uplink transmission.

Optionally, first computing unit comprises:

The said first analysis unit, used for parsing transmitting power of the CAP from a CAP broadcast message;

The calculating unit, used for estimating uplink path loss depending on STA received signal power and CAP transmit power.

Optionally, first determination unit comprises:

A second analysis sub-unit, used for acquisition resource indication by parsing control channel CCH of currently received physical frame;

A first determining sub-unit, used for utilizing the resource indication, determining transmission bandwidth for uplink transmission allocated by CAP.

Optionally, second determining unit comprises:

A third analysis unit, acquiring modulation coding mode indication by parsing CCH of currently received physical frame;

A second determining sub-unit, used for utilizing said modulation coding scheme indication, determining modulation coding;

A third determining sub-unit, by looking up a preset correspondence table of modulation encoding with carrier-to-noise ratio, determining carrier-to-noise ratio corresponding to modulation coding scheme.

To attain the above and related objects, one or more embodiments include the features that will be illustrated in detail below and specifically designated in the claims. The following illustration and drawings illustrate some exemplary aspects in detail; moreover, it only indicates some of the various modes that may be utilized by the principle of each embodiment. Other benefits and novel features will be apparent from the following detailed illustration in conjunction with the drawings, and all the embodiments disclosed intend to contemplate all these aspects and their equivalents.

DETAILED DESCRIPTION OF THE INVENTION

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part of and a certain feature of some embodiments may be included in or replaced by a part of and a certain feature of other embodiment. The scope of the embodiment of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended certainly to limit the application scope to any individual invention or inventive concept.

Figure 1:
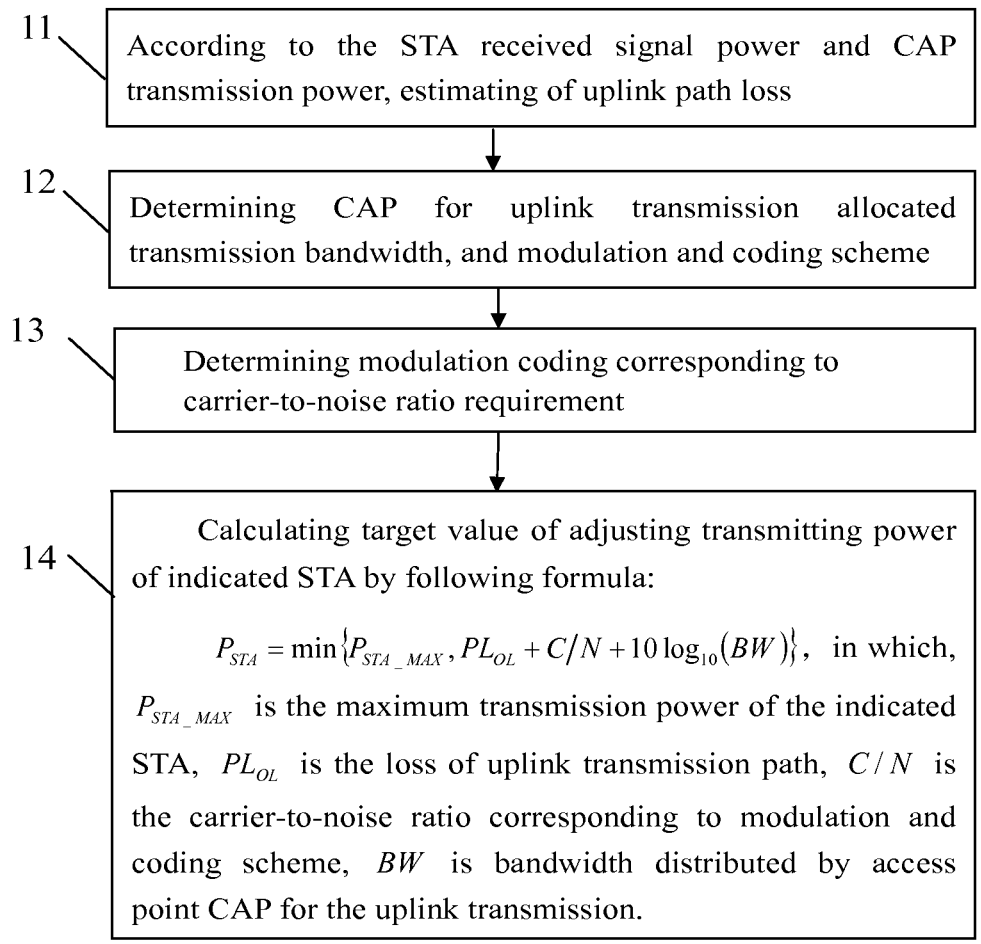
FIG. 1 is the flow chart of the first method of uplink transmission open loop power control in the embodiment of this Invention.

FIG. 1 is the flow chart of the first type of method of uplink transmission open loop power control in the embodiment of this Invention, and this flow includes:

Step 11: According to the STA received signal power and CAP transmission power, estimating of uplink path loss.

Step 12: Determining CAP for uplink transmission allocated transmission bandwidth, and modulation and coding scheme.

Step 13: Determining modulation coding corresponding to carrier-to-noise ratio requirement.

Step 14: Calculating target value of adjusting transmitting power of indicated STA by following formula:

$$P_{STA} = \min\{P_{STA\_MAX}, PL_{OL} + C/N + 10\log_{10}(BW)\}$$

in which, $P_{STA\_MAX}$ is the maximum transmission power of the indicated STA, $PL_{OL}$ is the loss of uplink transmission path, C/N is the carrier-to-noise ratio corresponding to modulation and coding scheme, BW is bandwidth distributed by access point CAP for the uplink transmission, and min is the minimum value of the maximum transmission power of STA plus the second part. The device of this formula is dBm.

The second kind of method of uplink transmission open loop power control in the embodiment of this invention, its flow is similar to Step 11~Step 12 shown in FIG. 1, only to calculate the target value of STA transmission power by use of the following formula in Step 11:

$$P_{STA} = \min\{P_{STA\_MAX}, PL_{OL} + C/N + 10\log_{10}(BW) + \text{offset}_{CAP} + \text{offset}_{STA}\}$$

in which, $P_{STA\_MAX}$ is the maximum transmission power of the indicated STA, $PL_{OL}$ is the loss of uplink transmission path, C/N is the carrier-to-noise ratio corresponding to modulation and coding scheme, BW is bandwidth distributed by access point CAP for the uplink transmission, $\text{offset}_{CAP}$ is the deviation adjustment of the indicated CAP, and the $\text{offset}_{STA}$ is deviation adjustment of the indicated STA. $\text{offset}_{STA}$ is a known value for each STA.

The alternative embodiments of the embodiment of this Invention is given below, all of which take the newly-defined system of enhanced ultrahigh transmission WLAN (EUHT) as the application scene, but such kind of application scene is the specific instance only.

Figure 2:
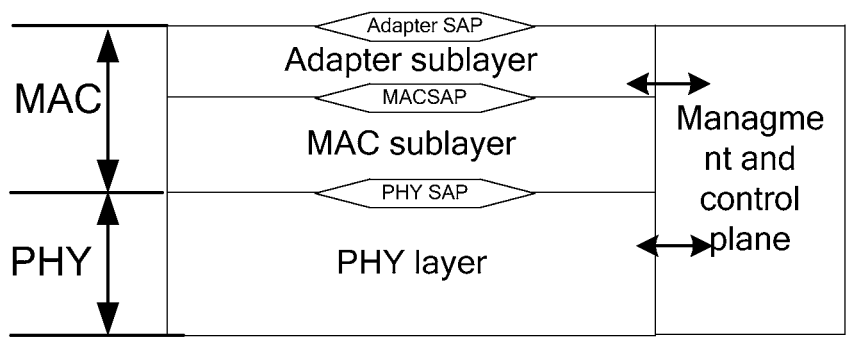
FIG. 2 is the reference model of EUHT system.

FIG. 2 is the reference model of EUHT system, mainly the reference model of the air interface, including media access control (MAC) layer and physical (PHY) layer, and main functions of each layer is described as follows:

(1) MAC layer including adaptation sub-layer and MAC sub-layer.

Adaptation sub-layer: mainly providing the functions of mapping and transformation between external network data and Service Data Device of MAC layer. MSDU indicates the data delivered as the device between the Service Access Points (SAP) of MAC.

MAC sub-layer: In addition to undertaking of the media access control function, also including the management and control of the system as well as support to the specific function of PHY layer.

(2) PHY layer: mainly providing the PHY transmission mechanism for map the MAC layer protocol data unit (MPDU) to the corresponding physical channel, such as orthogonal frequency division multiplexing (OFDM) and multi-input multi-output technology. MPDU indicates the data unit exchanged by use of PHY layer service between two peer entities.

Figure 3:
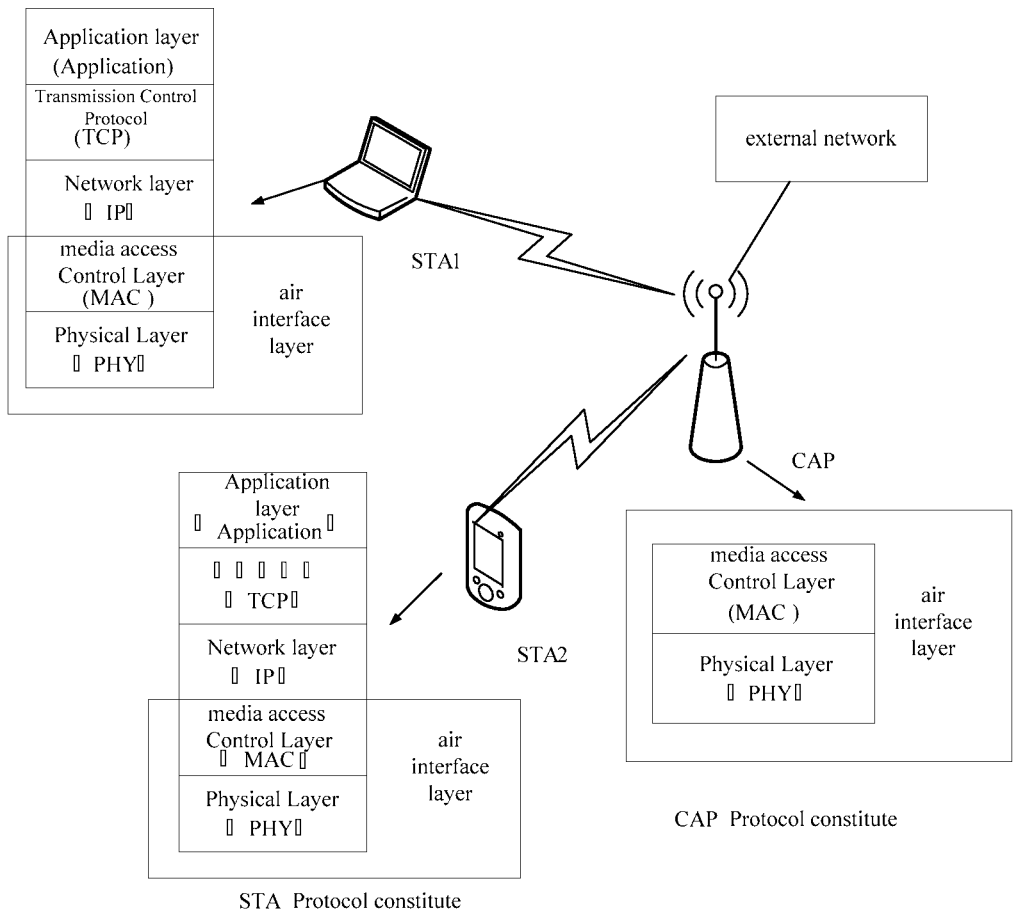
FIG. 3 is the access system composition of EUHT system.

FIG. 3 is the access system composition of EUHT system, including central access point (CAP) and station (STA), of which STA may be various types of data equipment, such as PDA, notebook, camera, video camera, mobile phone, tablet computer and pad. As shown in FIG. 3, STA1 and STA2 are accessed to CAP through the air interface protocol, and CAP establishes the communication with the external network (such as IP backbone network, Ethernet) through wire or wireless. In which, the protocol composition of CAP includes MAC layer and PHY layer. The protocol composition of STA includes application (Application) layer, transmission control protocol (TCP) layer, Internet protocol (IP) layer, MAC layer and PHY layer.

Figure 4:
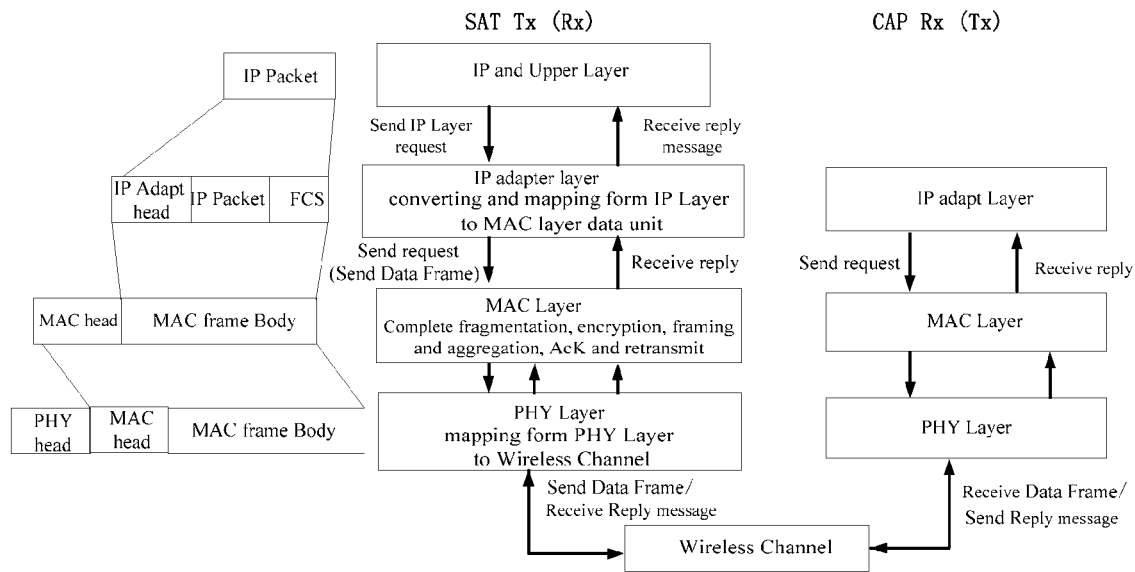
FIG. 4 is the flow diagram of sending and receiving of the protocol data between STA and CAP.

Based on the protocol composition as shown in FIG. 3, FIG. 4 gives the process of sending and receiving of protocol data between STA and CAP, for example, if STA wants to send data to CAP, STA will first process and package the application data (such as VoIP, video, etc.) through the application layer and TCP/IP layer, and send to IP adaptation sub-layer in the form of IP grouping, which will carry out converting and mapping, and send to MAC sub-layer, and then MAC sub-layer will sent to PHY layer through operations such as fragmentation, encryption, framing and aggregation, etc., and finally mapped by PHY onto the wireless channel for data transmission.

For the purposes of this invention first uplink access power control method mentioned the following alternative embodiments.

In some alternative embodiments, STA can obtain transmitting power of CAP through information broadcasted by CAP.

In EUHT system, the broadcast information frame (BCF) is a type of frame of CAP broadcast, CAP will regularly broadcast BCF, and each time STA detects BCF, the transmission power of CAP can be obtained.

The frame body of BCF has the CAP transmission power fields of 8 bytes to indicate the current transmission power of CAP, and such field corresponds to the decimal number of n, n=−128~127 (negative part is expressed in anti-code form): CAP transmission power is n dBm.

It can be seen that BCF carries CAP transmission power, and CAP transmission power can be obtained after STA receives BCF. Then STA estimate loss of uplink transmission path according to received signal power of STA and transmitting power of CAP, for instance, under the case of symmetry of uplink path and downlink path, estimate the loss of downlink transmission path through measurement of received power of current leading or data part based on reference to the transmission power of CAP.

In some alternative embodiments, STA analyzes the control channel (CCH) of the physical frame sent by CAP to obtain the resource indication aiming at the current uplink transmission, and determine the transmission bandwidth distributed by CAP for the uplink transmission.

In some alternative embodiments, STA by parsing the CCH of currently received physical frame acquisition modulation encoding scheme indication, determining modulation and coding mode, then according to preset correspondence table of modulation encoding with carrier-to-noise ratio, by way of lookup table, determining a current modulation and coding mode vs. Carrier-to-noise ratio.

In some alternative embodiments, assuming STA side and CAP side have the specified fixed value of deviation adjustment respectively, when STA calculates the target value of the adjusted transmission power, it can be considered to add the fixed value of deviation adjustment on STA side and CAP side into the formula, namely, add the fixed value of deviation adjustment on STA side and CAP side with the calculation result of $PL_{OL}+C/N+10 \log_{10}(BW)$.

Aiming at the second kind of method of uplink transmission power control in the embodiment of this invention, in the alternative embodiments, determining the transmission power of CAP, estimate the loss of uplink transmission path, determine modulation and coding mode, determine transmission bandwidth distributed by indicated CAP for uplink transmission and determining carrier-to-noise ratio corresponding to modulation and coding mode. these methods, same as that in alternative embodiments of the second kind of method of uplink transmission power control. Just in the second uplink access power control method in embodiment of present invention, STA can be by CAP broadcast message, such as foregoing BCF frame, to determine deviation adjustment of CAP.

Figure 5:
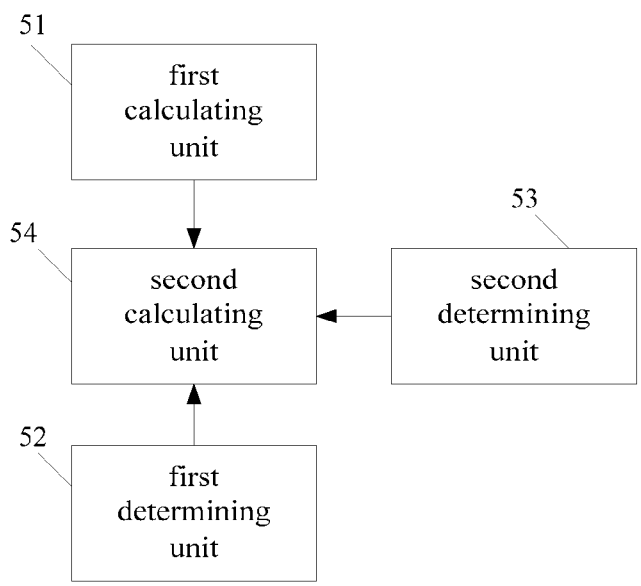
FIG. 5 is a structural schematic of first type of device of uplink transmission open-loop power control in the embodiment of this Invention.

FIG. 5 is the structural diagram of the first type of device of uplink transmission open loop power control in the embodiment of present invention, and this device includes first calculating unit 51 and first determining unit 52, second determining unit 53 and second calculating unit 54.

The said first calculating unit 51, used for calculating the target value of STA transmission power.

The said first determining unit 52, used for determining CAP for uplink transmission allocation of transmission bandwidth.

The said second determining unit 53, used for determining modulation and coding mode, and carrier-to-noise ratio corresponding to modulation and coding mode.

The said second calculating unit 54, used for Calculating target value of adjusting transmitting power of indicated STA by following formula:

$$P_{STA}=\min \{P_{STA\_MAX}, PL_{OL}+C/N+10 \log_{10}(BW)\}$$

in which, $P_{STA\_MAX}$ is the maximum transmission power of the indicated STA, $PL_{OL}$ is the loss of uplink transmission path, C/N is the carrier-to-noise ratio corresponding to modulation and coding scheme, with respect to noise and interference on the receiving terminal, BW is the bandwidth distributed by access point CAP for the uplink transmission.

For the second type of device of uplink transmission open loop power control in the embodiment of this invention, its structure is basically same as shown in FIG. 5, but the second calculating unit 54 in such unit calculates the adjusted target value of the STA transmission power through the following formula:

$$P_{STA}=\min \{P_{STA\_MAX}, PL_{OL}+C/N+10 \log_{10}(BW)+ \text{offset}_{CAP}+\text{offset}_{STA}\}$$

in which, $P_{STA\_MAX}$ is the maximum transmission power of the indicated STA, $PL_{OL}$ is the loss of uplink transmission path, C/N is the carrier-to-noise ratio corresponding to modulation and coding scheme, with respect to noise and interference on the receiving terminal, BW is the bandwidth distributed by access point CAP for the uplink transmission. $\text{offset}_{CAP}$ is the deviation adjustment of the indicated CAP, and the $\text{offset}_{STA}$ is the adjustment of the indicated STA. and second uplink access open loop power control device in embodiment of present invention further comprises a third determination unit, used for determining deviation adjustment of CAP.

First kind of device for controlling uplink access open-loop power in alternative embodiment of present invention.

In some alternative embodiments, the first computing unit comprises: a first analysis unit and a calculating unit.

The said first analysis unit, used for parsing transmitting power of the CAP from a CAP broadcast message.

The calculating unit, used for estimating uplink path loss depending on STA received signal power and CAP transmit power.

In some alternative embodiments, the first determination unit comprises: a second analysis sub-unit and a first determining sub-unit.

The second analysis sub-unit, used for acquisition resource indication by parsing control channel CCH of currently received physical frame.

The said first determining sub-unit, used for utilizing the resource indication, determining transmission bandwidth for uplink transmission allocated by CAP.

In some alternative embodiments, the second determining unit comprises: third analysis unit, a second determining sub-unit and a third determining sub-unit.

The third analysis unit, acquiring modulation coding mode indication by parsing CCH of currently received physical frame.

The second determining sub-unit, used for utilizing said modulation coding scheme indication, determining modulation coding.

The third determining sub-unit, by looking up a preset correspondence table of modulation encoding with carrier-to-noise ratio, determining carrier-to-noise ratio corresponding to modulation coding scheme.

In alternative embodiments of the second type of method of uplink transmission power control, just in the second uplink access power control method in embodiment of present invention, with an alternative embodiment of first uplink access open loop power device of alternative embodiment is substantially the same, just adding a third determination unit, used for parsing the CAP broadcast message, obtaining deviation adjustment of CAP.

Means for open loop power control are provided by present invention, this mean can be located in the STA, it can also be a separate entity located with the STA ipsilaterally.

It should be understood that the specific order or hierarchy of the steps in the process disclosed is only an example of the exemplary methods. The specific order or hierarchy of the steps in the process may be re-arranged based on design preference, without departing from the protection scope of the invention. The method claims appended give various step factors in an exemplary order, rather than being limited to the specific order or hierarchy.

In the above detailed description, to simplify the invention, various features are combined in a single implementation solution. This disclosing method should not be interpreted as reflecting such an intention; that is, the implementation solutions of the subject to be protected require more features than those stated clearly in each claim. On the contrary, as reflected in the appended claims, the invention is in a state in which it has less features than the whole features of a single implementation solution that is disclosed. Therefore, the claims appended are hereby incorporated in the detailed description clearly, wherein each claim independently acts as an individual preferred implementation solution of the invention.

The above description includes the examples of one or more embodiments. However, it is impossible to combine all the possibilities of the components and methods that are used to describe the above embodiments, but it should be recognized by one skilled in the art that each embodiment may be further combined and arranged. Therefore, the embodiments described herein intend to contemplate all such changes, modifications and variations that fall into the protection scope of the appended claims. In addition, for the term "comprise" used in the specification or the claims, it is similar to the term "include", just like the interpretation of "include" in the claims as a connection word. In addition, any term "or" used in the claims or the specification intends to represent a "non-exclusive or".

The invention claimed is:

1. A method for open loop uplink access power control, comprising:
   estimating an uplink transmission path loss according to a received signal power of a station (STA) and a transmit power of a central access point (CAP);
   determining a transmission bandwidth allocated by CAP for uplink transmission and deviation adjustment of CAP;
   determining a modulation-coding mode and determining requirements of a carrier-to-noise ratio corresponding to modulation-coding mode; and
   calculating a target value for adjusting transmit power of the STA by a formula:

$$P_{STA}=\min\{P_{STA\_MAX}, PL_{OL}+C/N+10\log_{10}(BW)+\text{offset}_{CAP}+\text{offset}_{STA}\}$$

wherein, $P_{STA\_MAX}$ is a maximum transmission power of said STA, $PL_{OL}$ is loss of uplink transmission path, C/N is the carrier-to-noise ratio corresponding to modulation and coding scheme, with respect to noise and interference on a receiving terminal, BW is a bandwidth distributed by access point CAP for the uplink transmission, $\text{offset}_{CAP}$ is deviation adjustment of the CAP, and $\text{offset}_{STA}$ is an adjustment of the STA.

2. The method of claim 1, further comprising obtaining a deviation adjustment of CAP by parsing the CAP broadcast message.

3. The method of claim 1, further comprising obtaining a resource indication by the STA by analyzing a control channel (CCH) of currently received physical frame, to determine transmission bandwidth distributed by CAP for the uplink transmission.

4. The method of claim 1, further comprising:
   acquiring modulation encoding scheme indication by STA by parsing a CCH of currently received physical frame;
   determining a modulation and coding scheme, by using a lookup correspondence table between preset modulation encoding and carrier-to-noise ratio; and
   determining a current modulation and coding scheme corresponding to carrier-to-noise ratio.

5. A device of uplink transmission open loop power control, comprising:
   first calculating unit that calculates a target value of STA transmission power;
   first determining unit that determines CAP for uplink transmission allocation of transmission bandwidth;
   second determining unit that determines modulation and coding mode, and carrier-to-noise ratio corresponding to modulation and coding mode;
   third determining unit that determines deviation adjustment of the CAP; and
   second calculating unit that calculates a target value for adjusting transmit power of the STA by a formula:

$$P_{STA}=\min\{P_{STA\_MAX}, PL_{OL}+C/N+10\log_{10}(BW)+\text{offset}_{CAP}+\text{offset}_{STA}\}$$

wherein, $P_{STA\_MAX}$ is a maximum transmission power of the indicated STA, $PL_{OL}$ is loss of uplink transmission path, C/N is the carrier-to-noise ratio corresponding to modulation and coding scheme, and BW is a bandwidth distributed by access point CAP for the uplink transmission.

6. The device of claim 5, wherein the third determining unit obtains deviation adjustment of CAP by parsing a CAP broadcast message.

7. The device of claim 5, wherein the first computing unit comprises:
   a first analysis unit that parses transmitting power of the CAP from a CAP broadcast message; and
   an estimating unit that estimates uplink path loss depending on STA received signal power and CAP transmit power.

8. The device of claim 5, wherein the first determination unit comprises:
   a second analysis sub-unit that acquires resource indication by parsing control channel CCH of currently received physical frame; and
   a first determining sub-unit that utilizes the resource indication for determining transmission bandwidth for uplink transmission allocated by CAP.

9. The device of claim 5, wherein the second determining unit comprises:
   a third analysis unit that acquires modulation coding mode indication by parsing CCH of currently received physical frame;
   a second determining sub-unit that utilizes the modulation coding scheme indication for determining modulation coding; and
   a third determining sub-unit that looks up a preset correspondence table of modulation encoding with carrier-to-noise ratio for determining carrier-to-noise ratio corresponding to modulation coding scheme.

* * * * *